United States Patent [19]

Ritter

[11] Patent Number: 4,877,188
[45] Date of Patent: Oct. 31, 1989

[54] DISTRIBUTION FOR FORMING A THIN LIQUID LAYER ON A SURFACE

[75] Inventor: Joseph Ritter, Tamm-Hohenstange, Fed. Rep. of Germany

[73] Assignee: Nestec S.A., Vevey, Switzerland

[21] Appl. No.: 200,002

[22] Filed: May 27, 1988

[30] Foreign Application Priority Data

Jun. 4, 1987 [EP] European Pat. Off. ............. 2128/87

[51] Int. Cl.$^4$ .......................... B05B 1/04; B05B 1/14; B05B 1/24
[52] U.S. Cl. ..................................... 239/135; 118/25; 118/411; 118/315; 222/387; 222/504; 239/558; 239/562; 239/584
[58] Field of Search ............... 239/135, 562, 558, 583, 239/584; 222/386, 387, 504, 509, 510; 118/25, 314, 411

[56] References Cited

U.S. PATENT DOCUMENTS

| | | | |
|---|---|---|---|
| 1,303,218 | 5/1919 | Esselmann | 222/387 |
| 2,818,999 | 1/1958 | Miller | 222/510 X |
| 3,186,597 | 6/1965 | Henderson | 222/387 X |
| 3,547,052 | 12/1970 | Artiaga | 118/25 |
| 4,227,069 | 10/1980 | Gardner | 239/135 X |
| 4,678,100 | 7/1987 | Gelinas | 222/504 X |

FOREIGN PATENT DOCUMENTS

| | | | |
|---|---|---|---|
| 544358 | 1/1956 | Belgium | 239/562 |
| 211479 | 11/1924 | United Kingdom | 118/14 |

Primary Examiner—Andres Kashanikow
Attorney, Agent, or Firm—Vogt & O'Donnell

[57] ABSTRACT

A device for distributing a liquid in the form of a thin layer on a surface is housed in a cylinder and is provided with a freely displaceable spring-loaded piston for ejecting and distributing liquid from a chamber formed by the piston and a base plate member having a plurality of bores. The base plate member bores are opened and closed by nozzle needles which extend through bores disposed in the displaceable piston to a support plate to which the needles are affixed and which is adapted for moving the needles towards and away from the base plate member bores for closing and opening the base plate member bores for regulating distribution of the liquid.

9 Claims, 2 Drawing Sheets

DISTRIBUTION FOR FORMING A THIN LIQUID LAYER ON A SURFACE

BACKGROUND OF THE INVENTION

This invention relates to a distributor for forming a thin layer of liquid on a surface.

Machines for applying viscous liquids or aerated emulsions, for example to baked products, are already known. US patent 3,547,052 relates to one such machine which enables a liquid to be uniformly distributed over a substrate. With a machine such as this, several strands of the viscous liquid can be prepared using a dosing head. The dosed quantity applied is fairly large so that there is no question of precision application.

SUMMARY OF THE INVENTION

The object of the present invention is to provide a machine with which a small quantity of a liquid can be distributed very regularly and very uniformly over a surface. Another important requirement is that, on application, the liquid should fall gently onto the surface.

The present invention relates to a distributor for forming a thin layer on a surface, consisting of a vertical cylinder with a plate formed with a plurality of holes, a piston provided with springs above the plate for ejecting the liquid from the distributing chamber and nozzle needles in the piston which correspond to the number and shape of the holes in the plate and which are held together for vertical displacement on a support plate.

The distributor according to the invention enables a thin layer to be formed from a plurality of liquid droplets which issue simultaneously from the nozzle plate and which flow into one another after impinging, for example, on the surface of a prefilled cup. The cup contains, for example, dessert, apple puree, yoghurt, etc., the liquid to be dosed preferably being chocolate. However, the liquid to be dosed may also be any other liquid, such as jelly, jam, marmalade, alcohol, cream. The liquids to be processed may also contain small particles with no pronounced tendency towards sedimentation.

The number of holes in the plate corresponds to the number of nozzle needles and each nozzle needle comprises a spring beneath the support plate. The support plate moves vertically after actuation by a piston rod associated with an air cylinder. The function of these various elements and also the exact operation of the distributor are described in the following with reference to the accompanying drawings.

To ensure effective sealing of the distributing chamber, the piston and the nozzle needles are provided with seals. The volume of the distributing chamber is dependent on the quantity which is dosed and applied. The height of the distributing chamber preferably varies between 0.2 and 10 mm.

The number of holes in the plate and the corresponding nozzle needles is dependent on the viscosity of the liquid. The higher the viscosity, the larger the number of holes necessary to enable the individual droplets to flow satisfactorily into one another. The number of holes is also dependent on the surface geometry and preferably varies between 5 and 50.

The distributor according to the invention is connected to a product container and a dosing unit of which the function is described in the following with reference to the drawings.

With a heating system in the product container, in the dosing unit and in the distributor, it is possible to improve fluidity of the liquid to avoid blockages and fouling of the distributor.

The distributor according to the invention is described in more detail in the following with reference to the accompanying drawings.

DETAILED DESCRIPTION OF THE DRAWINGS

Figure 1:
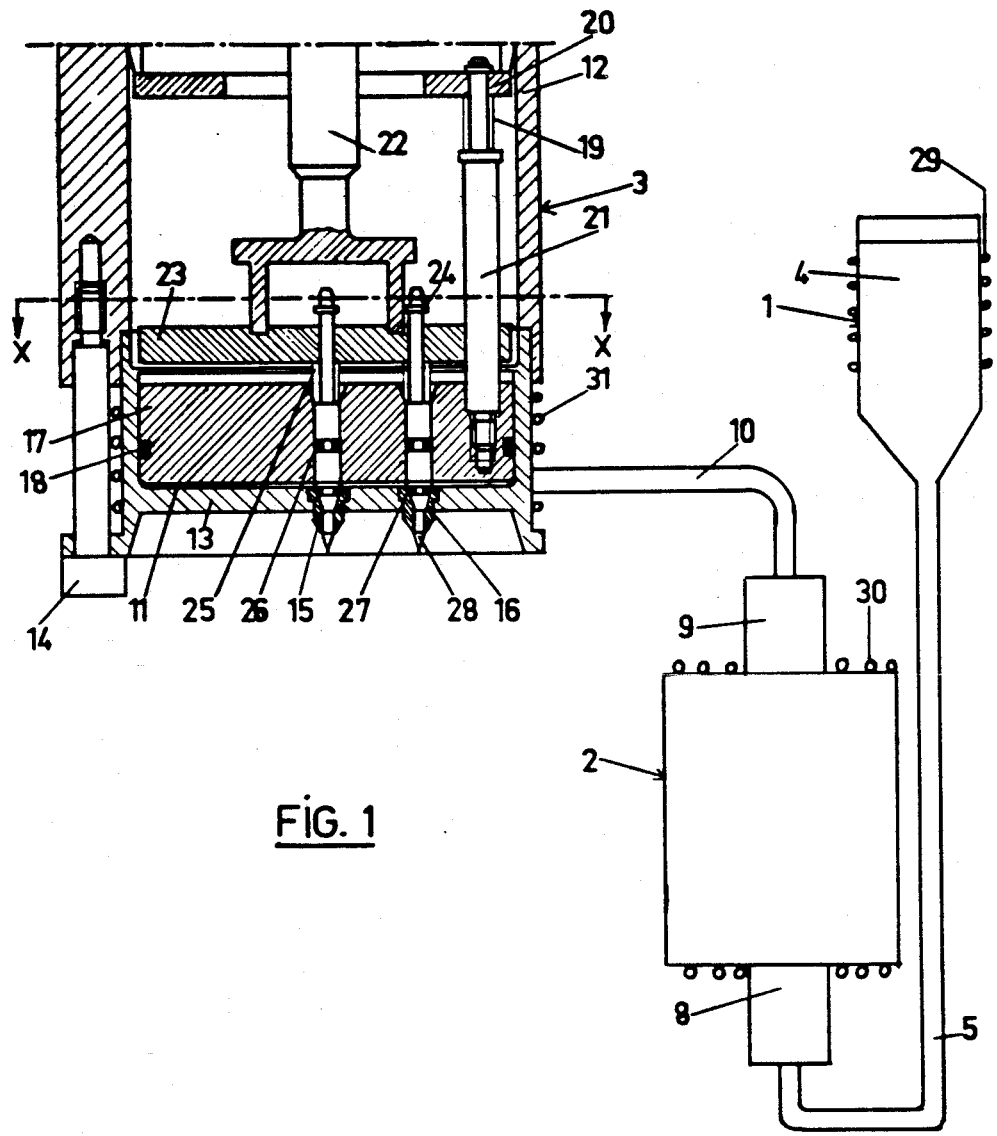
FIG. 1 is a partial longitudinal section through the distributor on the line Y—Y in FIG. 2.

The distributor (3) according to the invention is connected to a product container (1) and a dosing unit (2). The product container (1) is filled with the liquid (4) to be dosed. The feed pipe (5) delivers the liquid into the dosing unit (2). The dosing unit comprises a piston (not shown) displaced in a dosing chamber for measuring off the particular quantity of liquid required. Automatic suction (8) and pressure valves (9) are associated with the dosing piston. The pipe (10) then brings the liquid into the distributing chamber (11) of the distributor (3).

The distributor (3) consists of a vertical cylinder (12) and a plate (13) which is fixed to the cylinder by screws (14). The plate is formed with nozzle bores or holes (15) which are disposed in sleeves (16) which are pressed into the plate and project downwards. The issuing droplets can thus be prevented from running into one another.

In the distributor (3), there is a freely displaceable piston (17) which is loaded by springs (19) and sealed by an O-ring (18). The springs are anchored to a pressure plate (20) and the rods (21) connect the springs to the piston (17) itself.

A pneumatically operated piston rod (22) moves nozzle needles (28) which are held in a support plate (23) and provided with safety rings (24). The nozzle needles (28) guided in the piston (17) have a cylindrical shank with an O-ring seal (26). The bores are closed by a conical seating which is provided with an O-ring (27) for better elastic sealing. The nozzle needles (28) are suspended from the common support plate (23) which is moved pneumatically up and down.

To obtain a uniform bearing pressure in each seating, the closing force is transmitted from the support plate (23) via springs, preferably helical springs (25).

The distributor according to the invention operates as follows:

The pneumatically operated dosing piston has an infinitely variable stroke length. This displacement piston forces the liquid (4) to be applied from the suction valve (8) through the outlet valve (9) and the connecting pipe (10) into the distributing chamber (11) of the distributor (3). The piston (17) is forced upwards by the inflowing liquid and increases the load applied by the springs (19). The liquid is uniformly distributed in distributing chamber (11). The piston rod (22) then draws the support plate (23) with its nozzle needles (28) upwards and releases the nozzle bores (15) in the plate (13). Through the release of the bores, the distributing chamber (11) is relieved of pressure and the piston (17) loaded by the springs (19) ejects the liquid through the nozzle bores (15) where it drops gently in the form of droplets onto the surface to be covered (not shown). The needles (28) moved back downwards into the starting position carefully eject the residual liquid from the bores. The rate at which the needles (28) rise and fall may be varied for adaptation to the particular quality of the liquid.

Figure 2:
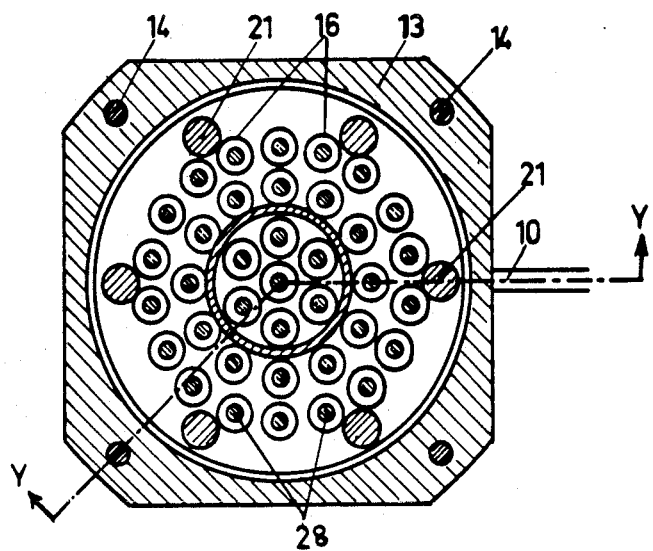
FIG. 2 is a section on the line X—X in FIG. 1.

In the embodiment shown in FIG. 2, the cylinder base plate (13) has thirty-seven holes so that the support plate (23) also has thirty-seven holes.

The geometric arrangement of a plurality of nozzle bores is dependent on the properties of the particular liquid and the geometric form of the surface to be coated.

The distributor according to the invention is particularly suitable for applying a thin layer of chocolate to desserts.

In order, in this case, to keep the chocolate liquid, the product container (1), the dosing unit (2) and the distributor (3) are provided with heating systems (29), (30) and (31), respectively.

The distributor for forming a thin layer on a surface may readily be integrated into a packing line and works at a speed corresponding to that of the filling machine. The distributor enables a uniform and thin layer, for example a parting layer, to be formed without this layer becoming mixed with the product in the cup. The distributor is also designed in such a way that it is easy to clean.

I claim:

1. A distribution device for forming a thin layer of liquid on a surface comprising:
   a cylinder housing;
   a base member comprising a plate being affixed to a first end of the cylinder housing and having a plurality of bores therethrough for distribution of the liquid;
   a pressure plate being affixed to a second end of the cylinder;
   a freely displaceable piston disposed within the cylinder adjacent the base plate member and connected to rods loaded by springs and anchored to the pressure plate, the displaceable piston being movable away from and towards the base plate member bores for forming a distributing chamber and having a plurality of bores corresponding in number and positioning with the base plate member bores;
   a connection into the chamber for allowing liquid to be distributed into the chamber for forcing the displaceable piston away from the base plate member bores;
   a support plate disposed within the cylinder between and displaced from the pressure plate and the displaceable piston and being movable to a position towards and to a position away from the displaceable piston and the base plate member bores; and
   a plurality of nozzle needles affixed to the support plate corresponding in number and position with the number and position of the base plate member bores and displaceable piston bores, the nozzle needles extending through the displaceable piston bores and having a configuration and length sufficient for extending to the base plate member bores so that when the support plate is moved to a position towards the displaceable piston and base plate member bores, the base plate member bores are sealed, and for allowing, when the support plate is moved to a position away from the displaceable piston and base plate member bores, liquid to be ejected and distributed, by means of the displaceable piston, through the base plate member bores.

2. A distribution device according to claim 1 further comprising a pneumatic piston extending into the second end of the cylinder and being affixed to the support plate for moving the support plate away from and towards the base plate member bores.

3. A distribution device according to claim 1 further comprising seals associated with the bores, the nozzle needles and displaceable piston for preventing leaks of liquid from the chamber.

4. A distribution device according to claim 1 or 2 or 3 wherein the nozzle needles have a cylindrical shank and the bores of the base plate member have a conical seating.

5. A distribution device according to claim 4 further comprising a spring associated with each nozzle needle and being positioned beneath the support plate for providing uniform bearing pressure of the nozzle needles in each seating.

6. A distribution device according to claim 1 wherein the chamber has a height from 0.2 mm to 10 mm.

7. A distribution device according to claim 1 wherein the base plate has from between five bores to fifty bores.

8. A distribution device according to claim 1 further comprising a system for heating liquid to be distributed.

9. A distribution device according to claim 1 wherein the freely displaceable piston is connected to from between three rods and nine rods loaded with springs.

* * * * *

UNITED STATES PATENT AND TRADEMARK OFFICE
CERTIFICATE OF CORRECTION

PATENT NO. : 4,877,188
DATED : October 31, 1989
INVENTOR(S) : Joseph RITTER

It is certified that error appears in the above-identified patent and that said Letters Patent is hereby corrected as shown below:

On the title page, in the title, "DISTRIBUTION" should be --DISTRIBUTOR--.

On the title page, in the FOREIGN APPLICATION PRIORITY DATA, "European Pat. Off." should be --Swiss Patent Office--.

Column 1, lines 1 and 2, the title, "DISTRIBUTION" should be --DISTRIBUTOR--.

Signed and Sealed this

Ninth Day of October, 1990

Attest:

HARRY F. MANBECK, JR.

*Attesting Officer*  *Commissioner of Patents and Trademarks*